United States Patent
Omichi et al.

(10) Patent No.: US 9,236,605 B2
(45) Date of Patent: Jan. 12, 2016

(54) POSITIVE ELECTRODE ACTIVE MATERIAL FOR NON-AQUEOUS ELECTROLYTE SECONDARY BATTERY

(71) Applicant: HONDA MOTOR CO., LTD., Tokyo (JP)

(72) Inventors: Kaoru Omichi, Wako (JP); Yuji Isogai, Wako (JP); Shintaro Aoyagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 14/025,155

(22) Filed: Sep. 12, 2013

(65) Prior Publication Data
US 2014/0079998 A1    Mar. 20, 2014

(30) Foreign Application Priority Data
Sep. 18, 2012  (JP) ................. 2012-204397

(51) Int. Cl.
| | |
|---|---|
| H01M 4/134 | (2010.01) |
| H01M 4/04 | (2006.01) |
| H01M 4/136 | (2010.01) |
| H01M 4/1397 | (2010.01) |
| H01M 4/36 | (2006.01) |
| H01M 4/58 | (2010.01) |
| H01M 10/052 | (2010.01) |
| H01M 4/62 | (2006.01) |

(52) U.S. Cl.
CPC ............ *H01M 4/134* (2013.01); *H01M 4/0471* (2013.01); *H01M 4/0497* (2013.01); *H01M 4/136* (2013.01); *H01M 4/1397* (2013.01); *H01M 4/366* (2013.01); *H01M 4/582* (2013.01); *H01M 4/624* (2013.01); *H01M 10/052* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 3,022,186 | A * | 2/1962 | Hund | 106/441 |
| 2003/0138697 | A1* | 7/2003 | Leising et al. | 429/231.1 |
| 2009/0087660 | A1* | 4/2009 | Suzuki et al. | 428/403 |
| 2011/0065001 | A1* | 3/2011 | Pereira et al. | 429/219 |
| 2013/0146819 | A1* | 6/2013 | Yoshida et al. | 252/502 |

FOREIGN PATENT DOCUMENTS

JP    2008-130265    6/2008

OTHER PUBLICATIONS

IPDL Machine Translation of the Detailed Description of JP 2008-130265A (Jun. 2008).*

* cited by examiner

*Primary Examiner* — Gregg Cantelmo
(74) *Attorney, Agent, or Firm* — Rankin, Hill & Clark LLP

(57) ABSTRACT

Provided is a positive electrode active material capable of obtaining high capacity density and also capable of obtaining sufficient charge-discharge characteristics in a region which involves high current density, when the positive electrode active material is used in a non-aqueous electrolyte secondary battery. The positive electrode active material for the non-aqueous electrolyte secondary battery includes FeF3 in which at least a part of a surface thereof is coated with an electro-conductive metal oxide.

6 Claims, 2 Drawing Sheets

POSITIVE ELECTRODE ACTIVE MATERIAL FOR NON-AQUEOUS ELECTROLYTE SECONDARY BATTERY

BACKGROUND OF THE INVENTION

1. Field of the Invention

The present invention relates to a positive electrode active material for a non-aqueous electrolyte secondary battery.

2. Description of the Related Art

A non-aqueous electrolyte secondary battery used as a secondary battery for electric vehicles and capable of charging and discharging, is desired to have a high energy density (capacity density) so as to be able to increase a travel distance thereof. Therefore, recently, consideration is given on using $FeF_3$ as a positive electrode active material of the non-aqueous electrolyte secondary battery. The positive electrode active material forms a positive electrode material by being mixed with a conductive auxiliary, a binder and the like.

$FeF_3$ has a high theoretical energy density (reversible capacity), and for example a non-aqueous electrolyte secondary battery using $FeF_3$ as a positive electrode active material and Li as a negative electrode active material is said to have a theoretical energy density of approximately 240 mAh/g (for example, refer to Japanese Patent Application Laid-Open No. 2008-130265).

On the other hand, when the non-aqueous electrolyte secondary battery is used as the secondary battery for electric vehicles, it is desired to be superior in charge-discharge characteristics in a region which involves high current density from receiving high load, such as during high-speed traveling or during hill-climbing (hereinafter sometimes referred to as a high-load characteristics). The charge-discharge characteristics is, for example, indicated by a capacity density when discharge is performed from a predetermined initial potential to a predetermined potential.

However, the positive electrode active material comprising $FeF_3$ has an inconvenience that, when the same is used in the non-aqueous electrolyte secondary battery, sufficient charge-discharge characteristics cannot be obtained in the region which involves high current density.

SUMMARY OF THE INVENTION

It is an object of the present invention to dissolve the above inconvenience and to provide a positive electrode active material capable of obtaining high capacity density when used in the non-aqueous electrolyte secondary battery, and also capable of obtaining sufficient charge-discharge characteristics in the region which involves high current density.

As a reason why the sufficient charge-discharge characteristics in the region which involves high current density cannot be obtained when the positive electrode active material comprising $FeF_3$ is used for the non-aqueous electrolyte secondary battery, the fact that $FeF_3$ is electrically insulative is conceivable. In a case where a material which is electrically insulative is used as the positive electrode active material, it is necessary to increase an additive amount of the conductive auxiliary with respect to the positive electrode material. However, when the additive amount of the conductive auxiliary is increased, an amount of $FeF_3$ as the positive electrode active material in overall positive material is reduced relatively, so that the energy density per unit weight of the positive material is reduced.

In order to achieve such object, a positive electrode active material for a non-aqueous electrolyte secondary battery of the present invention comprises $FeF_3$ in which at least a part of a surface thereof is coated with an electroconductive metal oxide.

The positive electrode active material of the present invention is prepared by coating at least a part of the surface of $FeF_3$ by the electroconductive metal oxide, so that electric conductivity is provided by the electroconductive metal oxide. As a result thereof, the positive electrode active material of the present invention may obtain sufficient charge-discharge characteristics even in the region which involves high current density.

Further, it is preferable that the positive electrode active material of the present invention includes the electroconductive metal oxide in a range of 1 to 5 mass %, and more preferably includes the electroconductive metal oxide in a range of 2.1 to 3.7 mass % with respect to a total amount of the positive electrode active material.

When the content of the electroconductive metal oxide is less than 1 mass % with respect to the total amount of the positive electrode active material, then there may be cases where the positive electrode active material of the present invention cannot obtain sufficient electric conductivity. Further, when the content of the electroconductive metal oxide exceeds 5 mass % with respect to the total amount of the positive electrode active material, the content of $FeF_3$ is reduced relatively, so that there may be cases where sufficient capacity may not be obtained.

The positive electrode active material of the present invention may obtain sufficient charge-discharge characteristics in the region which involves high current density, by setting the content of the electroconductive metal oxide in the range from 2.1 to 3.7 mass % with respect to the total amount of the positive electrode active material.

Further, in the positive electrode active material of the present invention, as the electroconductive metal oxide, one type of a metal oxide selected from a group consisting of $RuO_2$, $SnO_2$, and $ZnO$ may be used.

DETAILED DESCRIPTION OF THE PREFERRED EMBODIMENTS

Next, embodiments of the present invention will be described in more detail below with reference to the accompanying drawings.

Figure 1:
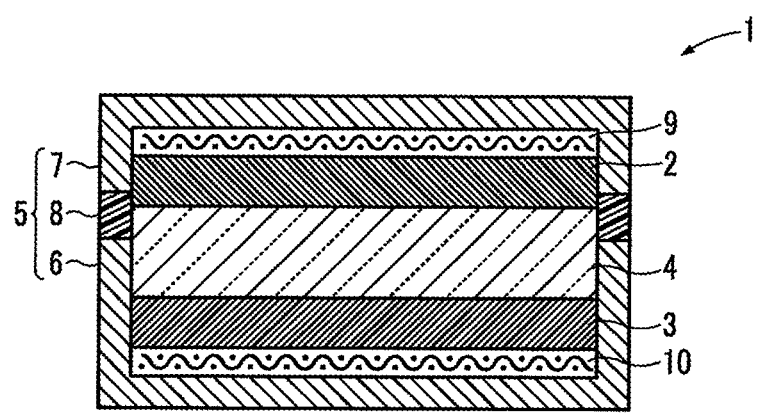
FIG. 1 is a cross-sectional view of a frame format showing one configuration example of a non-aqueous electrolyte secondary battery using a positive electrode active material of the present invention.

As shown in FIG. 1, a non-aqueous electrolyte secondary battery of the present embodiment is equipped with a positive electrode 2, a negative electrode 3, and an electrolyte layer 4 disposed between the positive electrode 2 and the negative electrode 3. The positive electrode 2, the negative electrode 3, and the electrolyte layer 4 are hermetically housed in a case 5. The case 5 includes a cup-form case body 6 and a lid body 7 to cover the case body 6, and an insulating resin 8 is interposed between the case body 6 and the lid body 7. The positive electrode 2 has a positive electrode current collector 9 between the positive electrode 2 and a top surface of the lid body 7, and the negative electrode 3 has a negative electrode current collector 10 between the negative electrode 3 and the bottom surface of the case body 6. In a non-aqueous electrolyte secondary battery 1, the case main body 6 acts as a negative plate, and the lid body 7 acts as a positive plate.

In the non-aqueous electrolyte secondary battery 1, the positive electrode 2 includes a positive electrode active material comprising $FeF_3$ which is obtained by coating at least a part of a surface thereof with an electroconductive metal oxide, and the positive electrode active material is mixed with an conductive auxiliary and a binder so as to from a positive electrode material. The positive electrode active material preferably includes the electroconductive metal oxide in a range of 1 to 5 mass % with respect to total amount of the positive electrode active material. When the content of the electroconductive metal oxide is less than 1 mass % with respect to the total amount of the positive electrode active material, then there may be cases where sufficient electric conductivity cannot be obtained. Further, when the content of the electroconductive metal oxide exceeds 5 mass % with respect to the total amount of the positive electrode active material, the content of $FeF_3$ is reduced relatively, so that there may be cases where sufficient capacity density cannot be obtained.

As the electroconductive metal oxide, for example, ruthenium oxide, tin oxide, zinc oxide, nickel oxide, cobalt oxide, copper oxide, indium oxide, silver oxide, and the like, are usable. Preferably, any one type of metal oxide selected from the group consisting of ruthenium oxide ($RuO_2$), tin oxide ($SnO_2$), and zinc oxide (ZnO), is used.

The positive electrode active material may be obtained, for example, by attaching a solution of a salt of a metal forming the electroconductive metal oxide to a surface of a powder of $FeF_3$, and thereafter vacuum drying and calcining the same. As the salt of the metal, for example, ruthenium chloride, tin chloride dihydrate, zinc acetate, nickel acetate, cobalt nitrate, copper nitrate, indium nitrate, silver nitrate and the like are usable. Further, as a solvent used for the solution, ethanol, methanol, 2-propanol and the like are usable.

Further, the vacuum drying may be performed, for example, by maintaining in a temperature of 90° C. for 8 to 15 hours, under vacuum of 100 Pa or lower. Further, the calcining may be performed, after the vacuum drying, by maintaining in a temperature of 200 to 500° C. for 0.1 to 1.0 hours, under atmospheric pressure.

As the conductive auxiliary, for example, carbon materials such as carbon black, acetylene black, carbon nanotube, and Ketjen black are usable. As the binder, polytetrafluoroethylene (PTFE) and the like is usable.

The positive electrode material may be manufactured, for example, as follows. First, the positive electrode active material comprising $FeF_3$ in which at least a part of the surface thereof is coated with the electroconductive metal oxide, and the conductive auxiliary are mixed using a ball mill and the like. Next, the obtained mixture is mixed with the binder so as to prepare the positive electrode material. The positive electrode material may be made into the positive electrode 2 by compacting.

Next, as the negative electrode 3, for example, metal lithium, lithium alloy and the like are usable.

Next, as the electrolyte layer 4, for example, a separator impregnated with a non-aqueous electrolyte solution in which lithium salt is dissolved in a non-aqueous solvent is usable. As the lithium salt, for example, lithium hexafluorophosphate ($LiPF_6$) and the like is usable, and as the non-aquaous solvent, for example, a mixed solvent of ethylene carbonate and diethyl carbonate, and the like, is usable.

Next, as the current collectors 9, 10, a mesh of titanium, stainless steel, nickel, aluminum, copper and the like is usable.

According to the non-aqueous electrolyte secondary battery 1 of the present embodiment, the positive electrode active material is comprised of $FeF_3$ in which at least a part of the surface thereof is coated with the electroconductive metal oxide, so that it becomes possible to obtain sufficient charge-discharge characteristics (high-load characteristics) in a region which involves high current density, while maintaining high capacity density of $FeF_3$.

Then, Examples of the present invention and Comparative Examples will be described.

EXAMPLE 1

In the present example, first, to 1 g of $FeF_3$ powder (made by Sigma-Aldrich Corporation), 1 ml of a solution obtained by dissolving ruthenium chloride in ethanol at a concentration of 100 mg/ml was dropped, and the mixture was mixed in an agate mortar so as to attach the solution to the surface of the $FeF_3$ powder. Next, after vacuum drying the $FeF_3$ powder with the solution attached to the surface thereof by maintaining the same in a temperature of 90° C. for 30 minutes under vacuum of 100 Pa or lower, the $FeF_3$ powder was calcined by maintaining the same in a temperature of 350° C. for 30 minutes under atmospheric pressure.

As a result, the positive electrode active material comprising $FeF_3$ powder in which at least a part of the surface thereof is coated with $RuO_2$ as the electroconductive metal oxide was obtained. The content of $RuO_2$ in the positive electrode active material was measured using energy dispersive X-ray spectrometry (EDX), and it was 2.4 mass % with respect to the total amount of the positive electrode active material. The result is shown in Table 1.

Next, 200 mg of the positive electrode active material powder obtained in the present example was pressed at a pressure of 30 MPa using a powder compacting machine, so as to prepare a pellet-shaped compact. Next, an electric resistance value of the compact was measured in a state where a pressure of 1 MPa was applied from above and below the compact. Thereafter, an electric conductivity of the positive electrode active material was calculated from the electric resistance value, a thickness of the compact, and an area of a pressed surface of the compact, and it was $5.9 \times 10^{-9}$ S/cm. The result is shown in Table 1.

Next, the positive electrode active material obtained in the present example and Ketjen black (made by Lion Corp., trade name: Ketjen black EC600JD) were mixed so as to become a mass ratio of positive electrode active material: Ketjen black =7:3, and the mixture was treated and mixed using a planetary ball mill at a rotation frequency of 360 rpm for 1 hour to thereby obtain a mixture of the positive electrode active material and Ketjen black.

Next, 30 mg of the mixture and an emulsion containing 3.45 mg of polytetrafluoroethylene (PTFE) were mixed in the agate mortar, and compacted to a pellet-shape by a powder compacting machine. Next, the positive electrode material compacted in a pellet-shape was bonded to the positive electrode current collector 9 comprised of an aluminum mesh, so as to obtain the positive electrode 2.

Next, a lithium foil is bonded to the negative current collector 10 prepared by welding a stainless mesh to a stainless plate, so as to obtain the negative electrode 3.

Next, the negative electrode 3 was disposed inside the stainless steel-made case body 6 of a bottomed cylinder form, so that the negative electrode current collector 10 contacted a bottom surface of the case body 6, and a separator comprised of a polypropylene microporous membrane was superposed on the negative electrode 3. Next, the positive electrode 2 and the positive electrode current collector 9 obtained as explained above were superposed on the separator, so that the positive electrode 2 contacted the separator. Next, a non-aqueous electrolyte solution was injected into the separator, to thereby form the electrolyte layer 4.

As the non-aqueous electrolyte solution, a solution was used in which lithium hexafluorophosphate ($LiPF_6$) as a supporting salt was dissolved in a concentration of 1 mol/l in a mixed solution of ethylene carbonate and diethyl carbonate mixed in a mass ratio of 7:3.

Next, a laminate body composed of the negative electrode current collector 10, the negative electrode 3, the electrolyte layer 4, the positive electrode 2, and the positive electrode current collector 9 housed in the case body 6 was covered with the stainless steel-made lid body 7. At this time, a ring-shaped insulating resin 8 was disposed between the case body 6 and the lid body 7, so as to obtain the non-aqueous electrolyte secondary battery 1 shown in FIG. 1.

Figure 2:
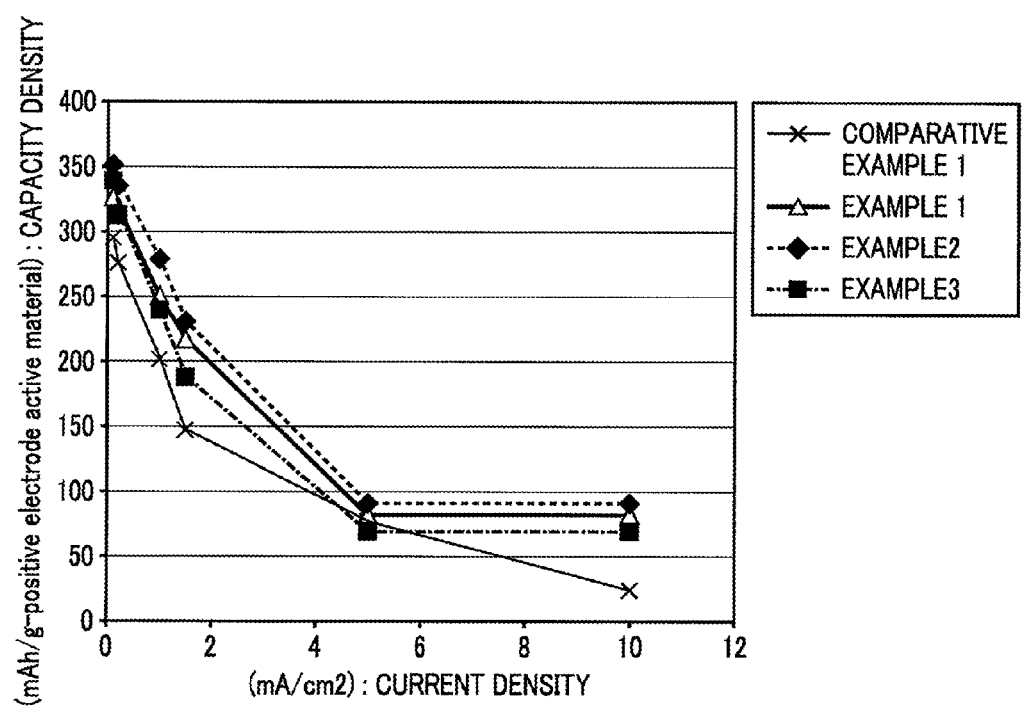
FIG. 2 is a graph showing a charge-discharge characteristics in a region which involves high current density of the non-aqueous electrolyte secondary battery using the positive electrode active material of the present invention.

Next, the non-aqueous electrolyte secondary battery 1 obtained in the present example was used, and a discharge test was performed in an atmosphere of room temperature (25° C.), with a voltage in a range of 1.5 to 4.5 V and a current density in a range of 0.1 to 10 $mA/cm^2$ with respect to $Li/Li^+$. The relationship between the current density and the capacity density at this time is shown in FIG. 2.

EXAMPLE 2

In the present example, the positive electrode active material comprised of $FeF_3$ powder in which at least a part of the surface thereof is coated with $SnO_2$ as the electroconductive metal oxide was obtained wholly the same as in Example 1, except that a solution in which tin chloride was dissolved in ethanol in a concentration of 300 mg/ml was used. The content of $SnO_2$ in the positive electrode active material was measured using EDX, and it was 3.7 mass % with respect to the total amount of the positive electrode active material. The result is shown in Table 1.

Next, the pellet-shaped compact was prepared wholly the same as in Example 1, except that the positive electrode active material obtained in the present example was used, and the electric resistance value of the compact was measured. The electric conductivity of the positive electrode active material was calculated from the electric resistance value, the thickness of the compact, and the area of the pressed surface of the compact, and it was $3.4 \times 10^{-8}$ S/cm. The result is shown in Table 1.

Next, the non-aqueous electrolyte secondary battery 1 shown in FIG. 1 was obtained wholly the same as in Example 1, except that the positive electrode active material obtained in the present example was used.

Next, the discharge test was performed wholly the same as in Example 1, except that the non-aqueous electrolyte secondary battery 1 obtained in the present example was used. The relationship between the current density and the capacity density at this time is shown in FIG. 2.

EXAMPLE 3

In the present example, the positive electrode active material comprised of $FeF_3$ powder in which at least a part of the surface thereof is coated with ZnO as the electroconductive metal oxide was obtained wholly the same as in Example 1, except that a solution in which zinc acetate was dissolved in ethanol in a concentration of 1.7 g/ml was used. The content of ZnO in the positive electrode active material was measured using EDX, and it was 2.1 mass % with respect to the total amount of the positive electrode active material. The result is shown in Table 1.

Next, the pellet-shaped compact was prepared wholly the same as in Example 1, except that the positive electrode active material obtained in the present example was used, and the electric resistance value of the compact was measured. The electric conductivity of the positive electrode active material was calculated from the electric resistance value, the thickness of the compact, and the area of the pressed surface of the compact, and it was $3.2 \times 10^{-9}$ S/cm. The result is shown in Table 1.

Next, the non-aqueous electrolyte secondary battery 1 shown in FIG. 1 was obtained wholly the same as in Example 1, except that the positive electrode active material obtained in the present example was used.

Next, the discharge test was performed wholly the same as in Example 1, except that the non-aqueous electrolyte secondary battery 1 obtained in the present example was used. The relationship between the current density and the capacity density at this time is shown in FIG. 2.

COMPARATIVE EXAMPLE 1

In the present Comparative Example, the positive electrode active material was prepared without coating the $FeF_3$ powder used in Example 1 with the electroconductive metal oxide at all.

Next, the pellet-shaped compact was prepared wholly the same as in Example 1, except that the positive electrode active material obtained in the present comparative example was used, and the electric resistance value of the compact was measured. However, the electric resistance value of the compact was beyond a measurement range, so that it was not measurable. Therefore, it was determined that the electric conductivity of the positive electrode active material was $1.0 \times 10^{-10}$ S/cm or lower. The result is shown in Table 1.

Next, the non-aqueous electrolyte secondary battery 1 shown in FIG. 1 was obtained wholly the same as in Example 1, except that the positive electrode active material obtained in the present comparative example was used.

Next, the discharge test was performed wholly the same as in Example 1, except that the non-aqueous electrolyte secondary battery 1 obtained in the present comparative example was used. The relationship between the current density and the capacity density at this time is shown in FIG. 2.

TABLE 1

| | electroconductive metal oxide | electroconductive metal oxide content (mass %) | electric conductivity (S/cm) |
| --- | --- | --- | --- |
| Example 1 | $RuO_2$ | 2.4 | $5.9 \times 10^{-9}$ |
| Example 2 | $SnO_2$ | 3.7 | $3.4 \times 10^{-8}$ |
| Example 3 | ZnO | 2.1 | $3.2 \times 10^{-9}$ |
| Comparative Example 1 | — | — | $1.0 \times 10^{-10}$ or lower |

From Table 1, it is clear that $FeF_3$ alone (Comparative Example 1) does not show electric conductivity, and the electric conductivity is provided by coating $FeF_3$ with electroconductive metal oxide (Examples 1 through 3).

Further, from FIG. 2, it is clear that, compared to the non-aqueous electrolyte secondary battery 1 of Comparative Example 1 containing the positive electrode active material consisting only of FeF$_3$, the non-aqueous electrolyte secondary battery 1 of Examples 1 through 3 containing the positive electrode active material comprising FeF$_3$ powder in which at least a part of the surface thereof is coated with the electroconductive metal oxide, and containing the electroconductive metal oxide in a range of 2.1 to 3.7 mass % with respect to the total amount of the positive electrode active material, have equivalent initial capacity density, show higher capacity density in a range which involves high current density of 2 to 10 mA/cm$^2$, and are superior in high-load characteristics.

What is claimed is:

1. A positive electrode active material for a non-aqueous electrolyte secondary battery comprising FeF$_3$ in which at least a part of a surface thereof is coated with an electroconductive metal oxide,
    wherein the positive electrode active material includes the electroconductive metal oxide in a range of 1 to 5 mass % with respect to a total amount of the positive electrode active material, and
    wherein the positive active electrode material further comprises a conductive auxiliary made of a carbon material.

2. The positive electrode active material for the non-aqueous electrolyte secondary battery according to claim 1, wherein the electroconductive metal oxide comprises one type of a metal oxide selected from a group consisting of RuO$_2$, SnO$_2$, and ZnO.

3. The positive electrode active material for the non-aqueous electrolyte secondary battery according to claim 1, wherein the conductive auxiliary consists of one of: carbon black; acetylene black; and carbon nanotube.

4. A positive electrode active material for a non-aqueous electrolyte secondary battery comprising FeF$_3$ in which at least a part of a surface thereof is coated with an electroconductive metal oxide,
    wherein the positive electrode active material includes the electroconductive metal oxide in a range of 2.1 to 3.7 mass % with respect to a total amount of the positive electrode active material, and
    wherein the positive active electrode material further comprises a conductive auxiliary made of a carbon material.

5. The positive electrode active material for the non-aqueous electrolyte secondary battery according to claim 4, wherein the electroconductive metal oxide comprises one type of a metal oxide selected from a group consisting of RuO$_2$, SnO$_2$, and ZnO.

6. The positive electrode active material for the non-aqueous electrolyte secondary battery according to claim 4, wherein the conductive auxiliary consists of one of: carbon black; acetylene black; and carbon nanotube.

* * * * *